(12) United States Patent
Chaiyochlarb et al.

(10) Patent No.: US 10,298,472 B2
(45) Date of Patent: May 21, 2019

(54) MEDIA CONNECTION CHANNEL QUALITY TESTING SYSTEM

(71) Applicant: Microsoft Technology Licensing, LLC, Redmond, WA (US)

(72) Inventors: Chan Chaiyochlarb, Redmond, WA (US); Ashfaque Tumbi, Redmond, WA (US); Sean P. Ryan, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 769 days.

(21) Appl. No.: 14/878,976

(22) Filed: Oct. 8, 2015

(65) Prior Publication Data

US 2017/0104647 A1    Apr. 13, 2017

(51) Int. Cl.
*G06F 13/00* (2006.01)
*H04L 12/26* (2006.01)
(Continued)

(52) U.S. Cl.
CPC ............ *H04L 43/08* (2013.01); *H04L 41/509* (2013.01); *H04L 41/5038* (2013.01);
(Continued)

(58) Field of Classification Search
CPC ..... H04L 43/08; H04L 65/80; H04L 41/5038; H04L 41/509; H04L 45/70; H04L 43/50;
(Continued)

(56) References Cited

U.S. PATENT DOCUMENTS

| 7,508,817 B2 | 3/2009 | Huang et al. |
| 8,055,201 B1 | 11/2011 | Kuan |

(Continued)

FOREIGN PATENT DOCUMENTS

| EP | 2039085 A2 | 3/2009 |
| GB | 2499733 A | 8/2013 |
| WO | 2013043308 A1 | 3/2013 |

OTHER PUBLICATIONS

ISA European Patent Office, International Search Report and Written Opinion Issued in PCT Application No. PCT/US2016/053860, dated Nov. 30, 2016, WIPO, 17 pages.
(Continued)

*Primary Examiner* — Kenneth R Coulter
(74) *Attorney, Agent, or Firm* — Alleman Hall Creasman & Tuttle LLP

(57) ABSTRACT

A computing device for media connection channel quality testing is described, including communications hardware; non-volatile memory storing a test initiation program; and a processor configured to execute the test initiation program to: transmit, via the communications hardware, a plurality of comparative testing media streams to a test server, each of the comparative testing media streams sent over one of a plurality of media connection channels; receive, via the communications hardware, a plurality of objective quality scores from the test server, each objective quality score corresponding to one of the plurality of media connection channels and are determined by the test server using an objective scoring test comparing the comparative testing media stream to reference testing data associated with the one of the comparative testing media streams; and select a recommended operational media connection channel from the plurality of media connection channels based on the objective quality scores.

20 Claims, 6 Drawing Sheets

(51) Int. Cl.
H04L 12/24 (2006.01)
H04L 29/06 (2006.01)
H04L 12/721 (2013.01)
H04W 24/06 (2009.01)
H04W 48/18 (2009.01)

(52) U.S. Cl.
CPC .............. H04L 43/50 (2013.01); H04L 45/70 (2013.01); H04L 65/1069 (2013.01); H04L 65/403 (2013.01); H04L 65/80 (2013.01); H04L 43/0829 (2013.01); H04L 43/0852 (2013.01); H04L 43/0882 (2013.01); H04L 43/0888 (2013.01); H04W 24/06 (2013.01); H04W 48/18 (2013.01)

(58) Field of Classification Search
CPC ............... H04L 65/1069; H04L 65/403; H04L 43/0829; H04L 43/0852; H04L 43/0882; H04L 43/0888; H04W 24/06; H04W 48/18
USPC ......................... 709/238, 239, 241, 242, 203
See application file for complete search history.

(56) References Cited

U.S. PATENT DOCUMENTS

| | | | |
|---|---|---|---|
| 8,081,580 B2* | 12/2011 | Nishi | H04L 29/12028 370/241 |
| 8,311,087 B2 | 11/2012 | Fok et al. | |
| 8,559,320 B2 | 10/2013 | Khanduri | |
| 8,565,766 B2 | 10/2013 | Scherzer et al. | |
| 9,324,375 B1* | 4/2016 | Casalena | H04L 65/80 |
| 9,754,627 B2* | 9/2017 | Casalena | H04L 65/80 |
| 2006/0221942 A1 | 10/2006 | Fruth et al. | |
| 2009/0296588 A1* | 12/2009 | Nishi | H04L 29/12028 370/242 |
| 2011/0096762 A1 | 4/2011 | Basart | |
| 2011/0130136 A1 | 6/2011 | Topaltzas et al. | |
| 2014/0064137 A1* | 3/2014 | El-Hennawey | H04M 3/2236 370/253 |
| 2014/0071895 A1 | 3/2014 | Bane et al. | |
| 2014/0379935 A1 | 12/2014 | Venkatasubramaniam et al. | |
| 2015/0029881 A1 | 1/2015 | Finlayson | |
| 2015/0142702 A1 | 5/2015 | Nilsson et al. | |
| 2016/0205165 A1* | 7/2016 | Casalena | H04L 65/80 709/219 |

OTHER PUBLICATIONS

Hanna, Sherif, "From LTE to Wi-Fi and Back: Call Continuity Brings the Next Generation of Calling", Published on: Jan. 5, 2015, Available at: https://www.qualcomm.com/news/snapdragon/2015/01/05/lte-wi-fi-and-back-call-continuity-brings-next-generation-calling.

"Voice, Video & Data Quality Testing Across All Networks (VQuad™—Dual UTA)", Retrieved on: Jun. 30, 2015, Available at: http://www.gl.com/vquad.html.

"PVQA—Passive Voice Quality Analysis", Retrieved on: Jun. 30, 2015, Available at: http://www.sevana.fi/passive-voice-quality-analysis.php.

"Service Continuity for Today's voice over LTE Subscribers", Retrieved on: Jun. 30, 2015, Available at: http://www.tmcnet.com/tmc/whitepapers/documents/whitepapers/2013/6684-service-continuity-todays-voice-over-lte-subscribers-ensuring.pdf.

"International Preliminary Report on Patentability issued in PCT Application No. PCT/US2016/053860", dated Aug. 4, 2017, 9 Pages.

* cited by examiner

MEDIA CONNECTION CHANNEL QUALITY TESTING SYSTEM

BACKGROUND

Computer devices are often equipped to use one of several media connection channels to place a voice or videoconferencing call to an intended recipient. In the case of voice calls, mobile computing devices such smartphones, tablets, etc., often are configured to communicate over audio connection channels such as third or fourth generation or long term evolution (3G/4G/LTE) mobile telecommunications networks that link to the Public Switched Telephone Network (PSTN), and also over audio connection channels established between voice over internet protocol (VOIP) application programs and remote servers over Internet connections via Wi-Fi access points. Likewise, videoconferencing calls may be placed on such mobile computing devices using one of various videoconferencing programs communicating over cellular data networks or over a Wi-Fi connection, for example. Although such mobile computing devices offer many choices for placing calls, one drawback with using such devices is that it may be difficult for a user to determine what type of call quality can be expected on different connection options prior to making the call. Because of this, a user may place a call using a program and network that yields low call quality. In addition, a user cannot determine whether a better quality alternative program and/or network for calling exists while actively engaged in a call. Because of this, a user may stay on a call with low quality, unknowing that higher quality alternatives are available. As a result, user miscommunication and frustration may arise.

SUMMARY

To address these issues, systems, devices, and methods for media connection channel quality testing are described herein. According to one aspect, a computing device is disclosed that includes communications hardware configured to send and receive communications over a communications network, non-volatile memory storing a test initiation program, and a processor configured to execute the test initiation program. When executed, the test initiation program causes the processor to transmit, via the communications hardware, a plurality of comparative testing media streams to a test server, each of the comparative testing media streams sent over one of a plurality of media connection channels. The test initiation program further causes the processor to receive, via the communications hardware, a plurality of objective quality scores from the test server, each objective quality score corresponding to one of the plurality of media connection channels and being determined by the test server using an objective scoring test comparing the comparative testing media stream to reference testing data associated with the one of the comparative testing media streams, and select a recommended operational media connection channel from the plurality of media connection channels based on the objective quality scores.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

A system for objectively testing multiple media connection channels supporting two-way audio and/or video connections from a computing device, such as a mobile computing device, is described herein. As used herein, a media connection channel refers to a program executed on the computing device and a network connection used by the computing device of a calling party to communicate in full duplex audio/video with a device of a called party. Either prior to or during a call, the computing device tests the connection quality of various available media connection channels, by establishing test connections with a test server and sending a comparative testing media stream over those test connection channels to the test server. The test server evaluates the quality of the comparative testing media stream when it is received, using a comparative test, such as mean opinion score (MOS) test, and sends a test score back to the computing device. After the comparative test, the computing device may select a recommended media connection channel based on the test score and prompt the user either prior to or during a call to utilize the recommended media connection for a call. Such an approach has the potential advantage of enabling users to avoid low quality channels when higher quality alternatives are available.

Figure 1:
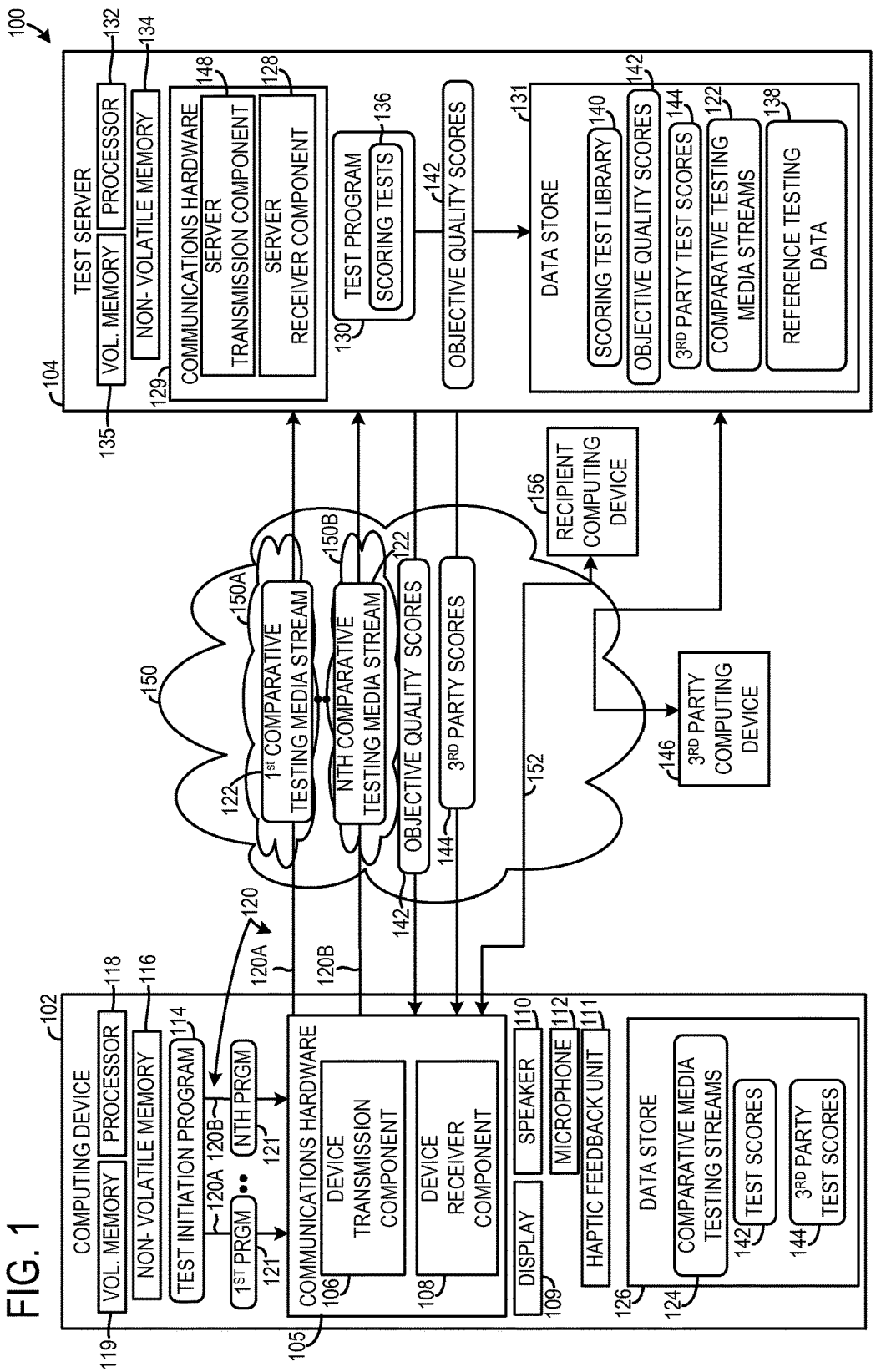
FIG. 1 shows a schematic depiction of a computing system for implementing comparative media connection channel quality testing, according to one embodiment.

FIG. 1 shows a computing system 100 for implementing objective quality score testing for different media connection channels. The computing system 100 includes a computing device 102 and a test server 104. The computing device 102 may be a mobile device such as a smart phone, tablet, etc., that can be easily transported, or a desktop computer, for example. The computing device 102 is equipped with non-volatile memory 116 which stores the programs and data discussed herein, and a processor 118 configured to execute the programs using portions of volatile memory 119. Likewise, the test server includes a non-volatile memory 134 which stores the server-side programs and data discussed herein, and a processor 132 configured to execute the programs using portions of volatile memory 135.

The computing device 102 and the test server 104 may be configured to communicate with each other via one or more of a plurality of communications networks 150. Particular examples of the various types of networks 150 are described in detail in relation to FIG. 2 below. Programs executed on each of computing device 102 and test server 104 are configured to communicate audio and/or video streams, as well as other data, with each other via networks 150.

The computing device 102 includes communication hardware 105 for transmitting and receiving data (e.g., audio/video signals/streams, objective quality scores, etc.) to and from the computing device 102. The communication hardware 105 may include a device transmission component 106 configured to transmit data to selected remote devices, servers, etc., via network 150. The device transmission component 106 may include wired transmitter(s) (e.g., Ethernet port, USB port, etc.) and/or a wireless transmitter(s) (e.g., an antenna for transmitting radio waves such as a Wi-Fi antenna, BLUETOOTH antenna or 3G/4G/LTE antenna, or an infrared transmitter, etc.). The communications hardware 105 of the computing device 102 also includes a device receiver component 108 for receiving data from remote devices through media connection channels. The device receiver component 108 may include wired receiver(s) (e.g., Ethernet port, USB port, etc.) and/or wireless receiver(s) (e.g., an antenna for receiving radio waves such as a Wi-Fi receiver, BLUETOOTH receiver or 3G/4G/LTE receiver, or an infrared receiver, etc.). In many embodiments, the device transmission component 106 and the device receiver component 108 are combined into a single transceiver or hardware port. Additionally, the computing device 102 may include a display 109, speaker 110, and a microphone 112 to facilitate audio conversations and video conferences between users of the computing device and users of remote computing devices.

The computing device 102 also includes a test initiation program 114 stored in non-volatile memory 116 and executable by a processor 118 using portions of volatile memory 119 on the computing device 102. The test initiation program 114 is configured to trigger testing of different media connection channels 120 at the test server 104. As discussed above, each media connection channel represents a different audio or video connection option that may be used to connect the computing device to target computing devices. The test initiation program 114 may be configured to cause initiation of an objective quality scoring test at the test server to measure audio and/or video quality of audio or video received at the test server over a media connection channel. As one example, the objective quality scoring test may be a MOS test. However, other objective quality score tests have been contemplated. MOS tests are configured to rate audio quality (e.g., listening quality, talking quality, etc.) or video quality on a scale. Many MOS tests use a rating scale with a range of 1-5, 5 being the highest quality and 1 being the lowest quality. However any rating scale can be used in the objective quality score test. The scoring tests enable the quality of each type of audio/video connection available through the computing device to be quantitatively determined.

Figure 2:
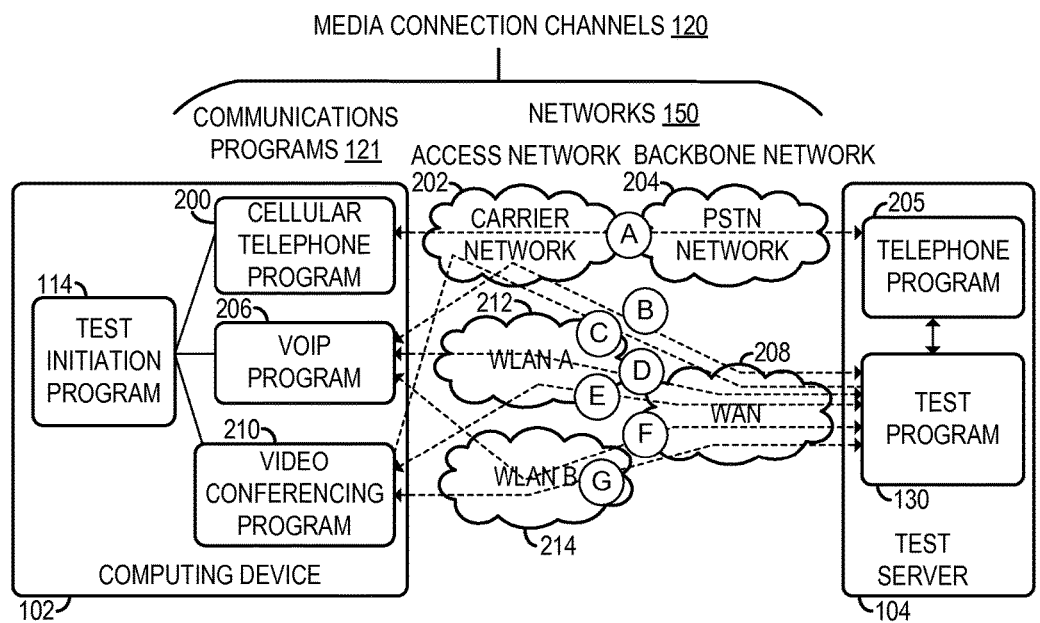
FIG. 2 shows a schematic depiction of various example media connection channels that may be established by the computing system of FIG. 1.

The test initiation program 114 is configured to discover a plurality of media connection channels, each comprised of a network-and-program pair as discussed above, which are available to the computing device user for placing audio or video calls. The network-and-program pair of each media connection channel enable the computing device 102 to achieve different types of two-way audio/video communication with a desired device. This discovery enables these network-and-program pairs of each media connection channel to be subsequently quality tested. As illustrated in FIGS. 1 and 2, it will be appreciated that each network-and-program pair includes a communications program 121 and a network 150. Example communications programs include VOIP programs, videoconferencing programs, and cellular telephone programs, as discussed above. Each network 150 may include an access network, such as a cellular carrier network or wireless LAN, and a backbone network such as a PSTN or WAN. For IP traffic originating from VOIP program or videoconferencing program, the access network may be a WLAN or LAN and the backbone may be a WAN such as the Internet, for example. For other voice and data communications the network 150 may include a cellular carrier network and a backbone network such as the PSTN for voice data or the Internet for IP traffic.

Turning briefly now to FIG. 2, a plurality of media connection channels 120 between computing device 102 and test server 104 are shown at A-G, each including a communications program 121 and a network 150. The test initiation program 114 is configured to discover which possible media connection channels 120 are available, for example, by querying an available database of voice and videoconferencing programs and by querying device information that indicates available networks 150, and identifying a plurality of network-and-program pairs for which communication may be established. Example communications program 121 includes a cellular telephone program 200 that communicates audio data via a wireless mobile connection (3G, 4G, LTE, etc.) to the PSTN, a VOIP program 206 that communicates audio data over available Wi-Fi connections to the Internet, and a videoconferencing program 210 that communicates audio and/or video data over a Wi-Fi connection to a WAN. It will be appreciated that the media connection channels 120 each delineate a path of an audio and/or video signal that originates at a microphone and/or video camera on computing device 102, travels through a communication program 121 executed on computing device 102 and over a communication network 150, to a second party, such as the test server 104, etc. Thus, each media connection channel represents a different option for audio and/or video connectivity available to the computing device 102.

Continuing with FIG. 2, example media connection channels A-G will now be described. Media connection channel A includes a cellular telephone program 200, a carrier network 202, and the PSTN 204. The cellular telephone program 200 is configured to make voice calls through the cellular carrier network 202, and the voice calls ultimately routed to a telephone program 205 on the test server via the PSTN. Telephone program 205 is programmed to answer the telephone calls from the computing device 102, and pass received audio data from the telephone calls to test program 130 for testing. Media connection channel B includes a VOIP program 206 connected to a data network of the cellular carrier network 202, which is able to carry VOIP data. The data network of the cellular carrier network 202 is configured to transmit the VOIP data to the test server 104 via a WAN 208, which it will be understood throughout may refer to the Internet. In this way, computing device 102 and test server 104 may communicate VOIP data via cellular carrier network 202 and WAN 208. Media connection channel C includes a videoconferencing program 210 that is connected to a data network of carrier network 202, and configured to send and receive audio and video data from the test server 104 via the carrier network 202 and WAN 208. It will be appreciated that, among other factors, the quality of each of the media connection channels A-C will be dependent on the strength of the signals transmitted between a transceiver in the computing device and a closest cellular tower of the cellular carrier network.

Continuing with FIG. 2, media connection channel D includes VOIP program 206 and wireless LAN A, and WAN 208, and is configured to transmit VOIP data between VOIP program 206 on computing device 102 and test program 130 on test server 104 via wireless LAN A and WAN 208. Media connection channel E includes videoconference program 210, wireless LAN A, WAN 208, and is configured to transmit audio and video data between videoconferencing program 210 on computing device 102 and test program 130 on test server 104 via wireless LAN A and WAN 208. It will be appreciated that, among other factors, the quality of the calls placed through media connection channels D and E will vary based on the strength of signal transmitted between the wireless LAN A and the computing device 102.

Continuing with FIG. 2, media connection channel F includes VOIP program 206, wireless LAN B, and WAN 208, and is configured to transmit VOIP data between the VOIP program 206 on computing device 102 and the test program 130 on test server 104 via wireless LAN B and WAN 208. Media connection channel G includes videoconference program 210, wireless LAN B, and WAN 208, and is configured to transmit audio and video data between the videoconferencing program 210 on computing device 102 and the test program 130 on test server 104 via wireless LAN B and WAN 208. It will be appreciated that, among other factors, the quality of the calls placed through media connection channels F and G will vary based on the strength of signal transmitted between the wireless LAN B and the computing device 102.

Returning to FIG. 1, following discovery of the media connection channels by the test initiation program 114, the test initiation program 114 is further configured to select a plurality of comparative media testing streams 122 to be sent over the plurality of media connection channels 120 to the test server 104. The plurality of comparative media testing streams 124 from which the comparative media testing streams 122 are selected are stored in a device-side data store 126 on the computing device 102. The data store 126 may, for example, be a database on a mass storage device, which is one type of non-volatile memory 116. After stream selection, the test initiation program 114 is configured to transmit, via the communications hardware 105, the selected plurality of comparative media testing streams 122 to the test server. Each of the comparative testing media streams is sent over one of the plurality of media connection channels 120. In FIG. 1, two media connection channels 120A and 120B are illustrated, including first program 121A and Nth program 121B and first network 150A and 150B, for the purpose of illustration. These two media channels 120A and 120B could be one of the media connection channels A-G discussed above and shown in FIG. 2, or other suitable channels.

The comparative media testing streams 122 may each include a predetermined audio segment with a predetermined profile. For instance, a testing stream may be a predetermined audio segment with a frequency profile that enables the objective testing of echo, delay, call volume, and/or clipping.

Regarding the conditions under which the comparative media testing streams 122 are determined to be sent by the testing initiation program 114, in some examples, the testing may occur in the background without user input. Thus, for example, the test initiation program 114 may be configured to transmit the comparative media testing streams 122 to the test server 104 over each media connection channel 120 in response to the discovery of each media connection channel 120, independent of user input. In one example, the comparative testing media streams 122 may be sent to the test server at predetermined time intervals following discovery of the media channel, to ensure that relatively current conditions on the media connection channel are tracked. In contrast, in other examples the testing may be accomplished in response to a user command to perform such testing. Thus, for example, the transmission of the comparative testing media testing streams 122 may be triggered in response to user input, such as a user action indicating a desire to make a phone call (e.g., operating a dialing keypad, opening a contact list, etc.) or in response to an express command by a user to conduct comparative testing and display available media connection channels and associated quality scores. In this way, the channel testing can be quickly and efficiently implemented either automatically or in response to a user command.

The comparative media testing streams 122 sent over the media connection channels 120 may each be selected from the plurality of comparative media testing streams 124 based on the parameters of the media connection channel over which they are transmitted. The parameters of the media connection channels may include data transmission rate, bandwidth (e.g., narrowband, wideband, or superband), signal strength, signal strength variation, signal intermittency, channel path, etc., of the media connection channel. For instance, a comparative media testing stream having a narrow bandwidth may be sent over a media connection channel supporting narrow bandwidth transmission. On the other hand, a comparative media testing stream having a wide bandwidth may be sent over a media connection channel supporting wide bandwidth transmission. In this way, the comparative media testing streams can be tailored to the specific parameters of the media connection channel over which they are sent. Using different types of tailored testing streams enables the comparative testing of the media connection channels to be improved.

Furthermore, the test initiation program 114 is also configured to encode one or more of the plurality of comparative media testing streams 122 prior to sending the streams over the media connection channels 120. The type of encoding may be selected based on performance parameters of the media connection channel over which the comparative media testing stream is sent. For instance, a media connection channel including a Wi-Fi enabled wireless LAN may provide faster data transmission than a media connection channel including a 3G cellular network for a data network. Therefore, the codec for the comparative media testing stream sent over a 3G media connection channel may be compressed to a greater degree (i.e., require less data for transmission) than the codec of the comparative media testing stream sent over a media connection channel that uses a Wi-Fi network. The type of encoding of the comparative testing media streams may be selected based on additional or alternative performance parameters of the media connection channel such as the channel bandwidth (e.g., narrowband, wideband, or superband), signal strength, signal strength variation, signal intermittency, etc.

Additionally in some examples, the test initiation program 114 can be configured to send the comparative media testing streams 122 to the test server 104 at time periods selected by the test initiation program based on one or more performance parameters of the media connection channels 120 over which the streams are sent. The performance parameters can include signal strength, signal variation, upload speed, download speed, measured link utilization, hop count, packet loss, delay (e.g., latency), path reliability, path bandwidth, background traffic, error propagation, queuing behavior, and/or throughput. For instance, a comparative media testing stream can be sent over a media connection channel when the signal strength and/or bandwidth of a media connection channel are above a threshold value, within a desired range, etc. In this way, the comparative media testing stream can be sent to the test server over the media connection channel only when the connection can reliably support the transmission of the testing stream, increasing testing reliability. It will be appreciated that the processing resources in the computing system can be more efficiently managed when testing reliability is increased.

Figure 4:
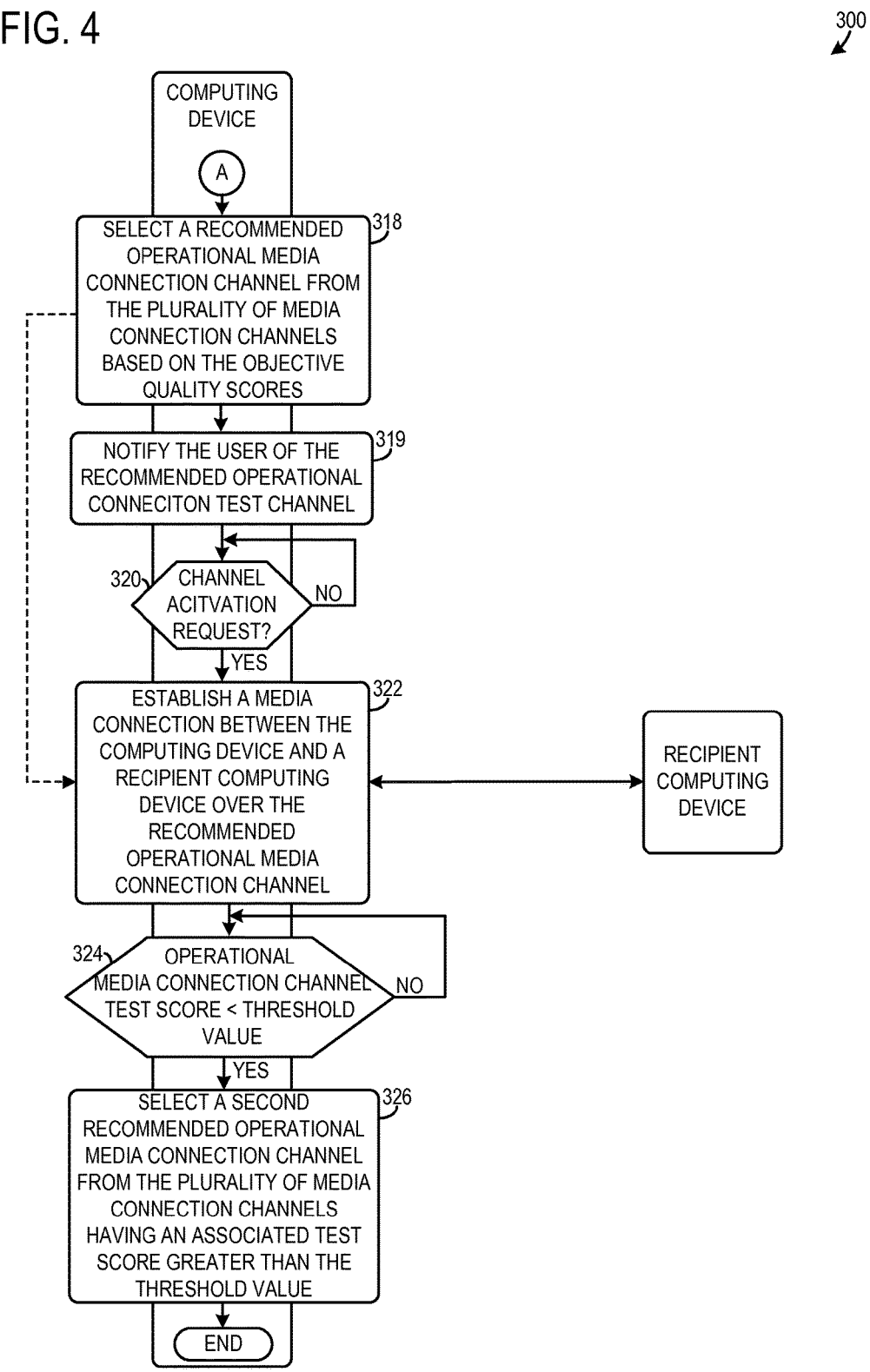

In another example, the test initiation program 114 may be configured to send the plurality of comparative media testing streams 122 to the test server 104 at time interval selected by a user. For instance, the testing streams may be transmitted to the test server at a predetermined time interval (e.g., 1 minute, 5 minutes, 1 hour, when the signal strength of a media connection channel is greater than a user-selected threshold value, etc.) designated by a user via a test setting interface. Accordingly, users can change different aspects of quality testing implementation according to their desire. This can enable a reduction in the likelihood of the quality testing interfering with other programs on the computing device, for example. An exemplary test setting interface is shown in FIG. 4, described in greater detail herein.

The test server 104 receives the comparative testing media streams 122 at a server receiver component 128 included in server side communication hardware 129. The comparative testing media streams 122 received by the test server 104 may be stored in a server-side data store 131, which may be a database in a mass storage device, which is a type of non-volatile memory 134. A test program 130 is provided and stored in non-volatile memory 134 executable by processor 132 using portions of volatile memory 135. When the test server 104 receives the comparative testing media streams 122 the test program 130 on the test server 104 is configured to execute an objective scoring test for each of the comparative testing media streams 122. Thus, the test program 130 executes a plurality of objective scoring tests 136. Each of the objective scoring tests 136 compares one of the plurality of comparative testing media streams 122 to reference testing data 138 corresponding to the audio stream. For instance, an audio file stored on the test server may be compared to a sample of the audio stream recorded by the test server. The audio stream and specific quality score testing data used for comparison may be matched through an identifier embedded in the audio streams and the quality score testing data. Additionally, the reference testing data 138 may be stored in the test server 104 to enable the comparative testing.

As previously discussed, the objective scoring tests may be MOS tests. The received comparative testing media streams, as modified by their transport through each media connection channel, are analyzed at the test server according to the MOS tests. For example, variables in the received streams such as echo, frame loss rate, speech distortion, wideband noise, and/or speech power may be used in the MOS test to objectively determine a degree of audio and/or visual call quality that can be expressed on a rating scale (e.g., 1-5). However, a wide variety of MOS tests using additional or alternative variables have been contemplated.

Exemplary MOS scoring tests includes a Perceptual Evaluation of Audio Quality (PEAQ) test, Perceptual Evaluation of Video Quality (PEVQ) test, Perceptual Evaluation of Speech Quality (PESQ) test, Perceptual Evaluation of Data-Download Quality (PEDQ) test, and a Perceptual Objective Listening Quality Assessment (POLQA).

The scoring tests 136 executed by the test program 130 may be selected from a plurality of scoring tests in a scoring test library 140 based on parameters of the comparative testing media stream it is testing. The parameters of the comparative testing media stream may include encoding, bandwidth, stream length, audio stream frequency profile, video stream color-spectrum profile, etc. For instance, audio streams compressed with high loss audio codecs may be tested using the PEAQ test, video streams with embedded audio may be tested using the PEVQ test, speech transmission may be tested using the PESQ test, data transmissions may be tested using the PEDQ test, and narrow band and super wideband voice quality streams may be tested using the POLQA test. However, numerous parameters of the streams and/or test channel may influence the type of test that is used to test the comparative testing media stream.

After the test program 130 runs the plurality of comparative scoring tests 136 for each of the plurality of comparative testing media streams 122, a plurality of objective quality scores 142 are generated, which are also referred to as test scores. The objective quality scores 142 may be stored at the test server 104 in the server-side data store 131.

Furthermore, the test server 104 may also generate and/or receive a plurality of third party scores 144 for comparative testing media streams sent to the test server 104 from a third party computing device 146 over additional media connection channels that share characteristics with the media connection channels 120. For example, the test server may be configured to identify third party scores 144 from media connection channels that share a common access network, such as a common Wi-Fi access point of a wireless LAN. In this way, objective quality scores from a multitude of computing devices that have connected to the test server via similar media connection channels 120 can be gathered, to improve media connection channel selection. With such an implementation, a computing device 102 might reduce the testing it performs for itself when recent third party scores exist for media connection channels that share an access network, for example, and instead rely solely or largely upon third party scores. As another example, the computing device 102 might reduce the frequency with which it conducts periodic testing of a media connection channel when third party scores 144 for similar additional media connection channels are available. Or, the test server itself could communicate with multiple computing devices connected to the same access network and coordinate periodic testing among them, for example, but causing comparative testing media streams to be sent only from such computing devices that are sufficient resources (e.g., sufficient available bandwidth and battery life), etc.

Additionally, responsive to generating the objective quality scores 142 a server transmission component 148 of the communication hardware 129 of test server 104 is configured to transmit the objective quality scores 142 to the computing device 102. The objective quality scores 142 may be transmitted over one or more of the plurality of media connection channels 120. For instance, an objective quality score corresponding to a 3G media connection channel may be sent to the computing device 102 through a data network of the 3G media connection channel. As another example, when the media connection channel does not support a data connection the test scores may be transmitted as an audio signal which can be used to express the magnitude of the quality score. For example, different audio frequencies and/or or audio segment having different lengths may be used to indicate different numerical values corresponding to the objective quality scores. In yet another example, the objective quality scores 142 may be transmitted over one or more networks distinct from the media connection channels. Thus, an objective quality score for a cellular carrier network may be communicate to the computing device 102 via the WAN and a wireless LAN connection, for example.

The server transmission component 148 is also configured to transmit the plurality of third party scores 144 to the computing device 102. As shown, the third party scores 144 are transmitted over the communication networks 150. In one example, the third party scores 144 may be sent over one or more of the plurality of media connection channels 120. However in other examples, the third party scores 144 may be sent over different communication paths including different networks, for instance.

Responsive to receiving the objective quality scores 142 the computing device 102 is configured to select a recommended operational media connection channel from the plurality of media connection channels 120 based on the magnitudes of the objective quality scores 142. For instance, the media connection channel having a score indicating a highest call quality among available media connection channels may be selected as the recommended operational media connection channel, provided the objective quality score is above a minimum quality threshold. In this way, a user can experience a high call quality over the connection channel, thereby improving user satisfaction. Additionally, the objective quality scores 142 and the third party scores 144 are stored in the device-side data store 126.

Other factors may be taken into account when selecting the recommended operational media connection channel. For instance, the operational media connection channel may also be selected based on data cost associated with each of the plurality of media connection channels 120. For instance, a Wi-Fi media connection channel may have a lower data cost than an LTE media connection channel. In such an example, the call quality of both the Wi-Fi media connection channel and LTE media connection channel may be similar. Therefore, the Wi-Fi media connection channel may be selected due to the lower data cost. In this way, data costs can be taken into account when selecting an operational channel preventing overuse of high cost media connection channels. However, the data costs may be used in other ways during media connection channel selection. In one example, the data costs may be specified by the user. However in other examples, the computing device 102 may determine the data costs in another manner.

Additionally, the recommended operational media connection channel may also be selected based on the third party scores 144. In this way, crowd sourced data can also be used in the audio channel selection process, to improve the reliability of the media connection channel selection. For instance, the third party scores 144 may be averaged with the objective quality scores 142 to determine combined objective quality scores for one or more of the media connection channels 120. However, numerous ways to incorporate the third party scores 144 into the channel selection algorithm have been contemplated such as weighting the objective quality scores. For instance, a third party test score may be used when a locally calculated test score for a media connection channel is not available.

The computing device 102 is also configured to establish an audio and/or video connection between the computing device 102 and a recipient computing device 156 over the recommended operational media connection channel, indicated at 152. The recipient computing device 156 can be selected by the user. This audio connection may be automatically established responsive to selection of the operational channel or may be established in response to user input. For instance, a user can be notified of the recommended operational media connection channel via a display 109, speaker 110, and/or haptic feedback unit 111. After this notification, the user may perform a channel activation request that triggers channel activation. This type of channel activation request may include a touch gesture, button input, audio input, etc., implemented by a user of the computing device. For example, a user may select a communication program and dial a number or enter an identifier associated with the recipient computing device 102 to establish an audio and/or video connection between the computing device 102 and the recipient computing device 156. However, numerous types of channel activation requests have been contemplated. In this way, the user can initiate an audio conversation over the recommended operational media connection channel.

Figure 3:
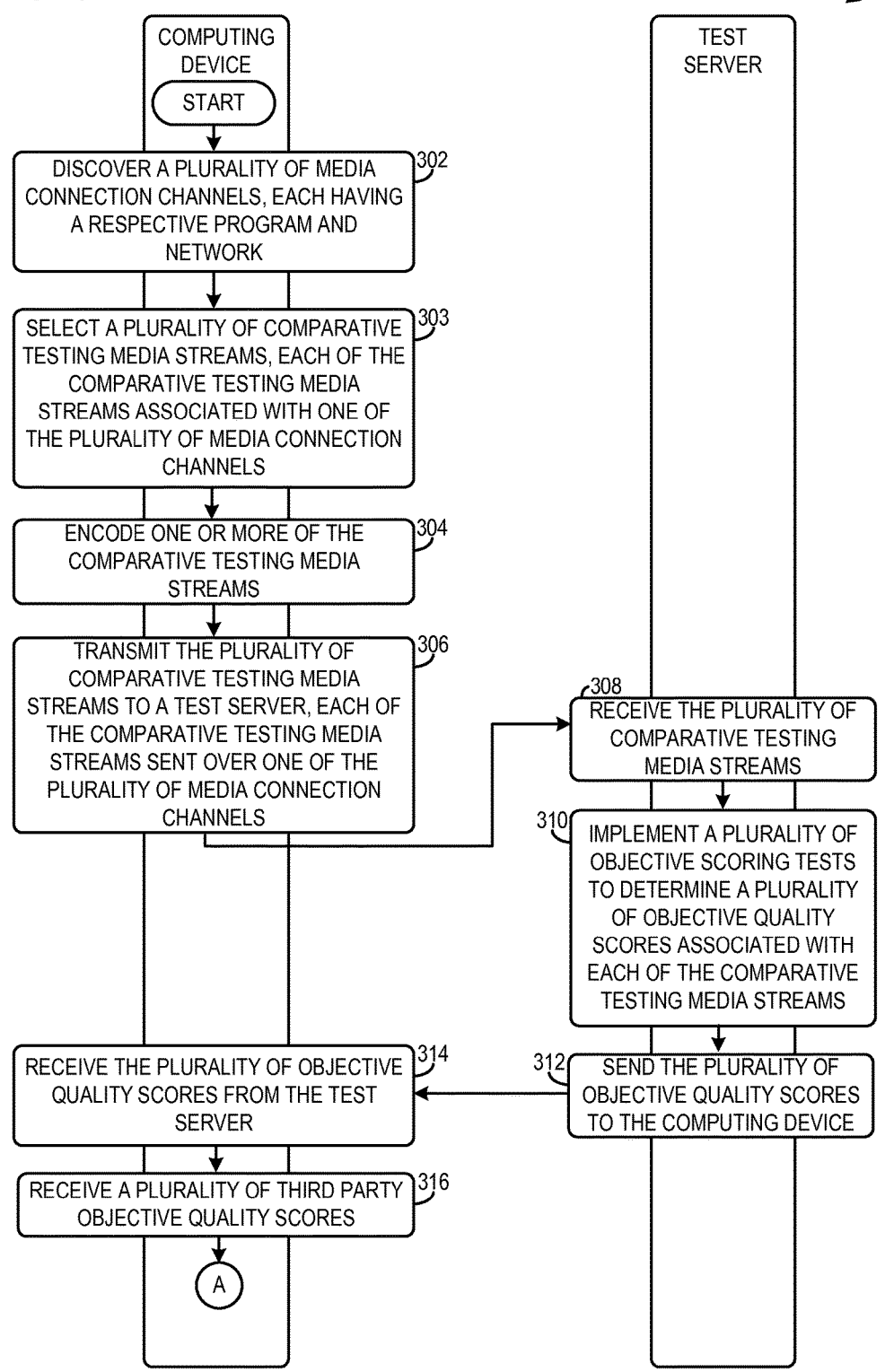
FIGS. 3 and 4 show a method for operating a computing system to achieve comparative media quality channel testing, according to one embodiment.

FIGS. 3-4 show a method 300 for operating a computing system. The method 300 may be implemented by the computing system 100 illustrated in FIG. 1 or by another suitable computing system.

As illustrated in FIG. 3, at 302 the method includes discovering a plurality of media connection channels, each of the media connection channels including a respective program and a network. Example media connection channels and their constituent programs and networks are illustrated in FIG. 2, discussed above.

At 303, the method includes selecting a plurality of comparative testing media streams, each of the comparative testing media streams associated with one of the plurality of media connection channels. As previously discussed, the plurality of comparative testing media streams may be selected based on the parameters of the media connection channel to which it is associated. The parameters of the media connection channel may include data transmission rate, bandwidth (e.g., narrowband, wideband, superband, etc.) signal strength, signal strength variation, signal intermittency, channel path, etc., of the media connection channel.

Next, at 304 the method includes encoding one or more of the comparative testing media streams. The type of encoding of the one of the comparative testing media streams may be selected based on one or more performance parameters of the media connection channel associated with the one of the comparative testing media streams. For instance, codecs having high compression may be selected for audio streams sent over test channels that do not support high data speeds. On the other hand, codecs having low compression may be selected for audio streams sent over test channels that can support high data speeds.

At 306, the method includes transmitting the plurality of comparative testing media streams to a test server, each of the comparative testing media streams being sent over one of the plurality of media connection channels. It will be appreciated that steps 302-306, as well as steps 314 through 326 discussed below, are typically performed at a computing device such as computing 102, described above.

At 308, the method includes receiving the plurality of comparative testing media streams. Next, at 310 the method includes implementing a plurality of objective scoring tests to determine a plurality of objective quality scores associated with each of the comparative testing media streams. As previously discussed, the objective scoring tests each compare one of the comparative testing media streams to quality score testing data associated with the one of the comparative testing media streams. In this way, the quality of the media connection channel associated with the tested audio stream can be objectively quantified. As previously discussed, the objective quality scores may be expressed on a rating scale such as a MOS rating scale (e.g., numerical values 1-5). The objective scoring test used for each of the comparative testing media streams may be selected from a plurality objective scoring tests. The test selection may be carried out based on various parameters (e.g., bandwidth, encoding, audio stream frequency profile, etc.) of the comparative testing media stream and/or the corresponding media connection channel. For instance, certain types of tests can be tailored to efficiently test highly compressed audio streams and other types of tests can be tailored to efficiently test high bandwidth audio streams. At 312, the method includes sending the plurality of objective quality scores to the computing device. It will be appreciated that steps 308-312 typically are performed at a server, such as test server 104, described above.

Next, at 314 the method includes receiving the plurality of objective quality scores from the test server. At 316, the method includes receiving a plurality of third party objective quality scores from a third party computing device.

Now referring to FIG. 4, at 318 the method includes selecting a recommended operational media connection channel from the plurality of media connection channels based on the objective quality scores. In this way, a media channel determined to support two-way audio and/or video communication having a high call quality can be selected. It will be appreciated that the recommended operational media connection channel may be selected either prior the placing a call or during an existing call.

At 319, the method includes notifying the user of the recommended operational connection channel. The user may be notified by a visual notification presented on a display, an audio notification played by a speaker, and/or vibration notification performed haptic feedback unit. For notifications prior to a user placing a call, the notification may be presented, for example, when a user provides user input indicative of a desire to place a call, such as dialing or selecting a contacts list. For example, when selecting a telephone icon next to a contact name, the computing device could present a menu with options for two available media connection channels, with the quality score of each represented (e.g., 5/5 graphical bars for VOIP over WIFI and 3/5 graphical bars for TELEPHONE over 3G), and selectors may be provided adjacent each option to initiate a call on each channel. On the other hand, for in-call notifications, a voice prompt may be presented to the user during a call that says, "To switch to a higher quality voice channel, please press or say '1'."

Next, at 320 the method determines if a channel activation request has been received from the user. Channel activation requests may include initiating a phone call through operation of a dialing pad, a voice input, touch gesture, etc. Further in one example, a channel activation request may include an input verifying that the user would like to use the operational connection channel. Referring specifically to the examples of the preceding paragraph, the channel activation requests are user selection of the selectors by each media connection channel, or a user's voice or keyboard input of '1'. Thus, in the example for in-call switching, the user may say or press 1 during a current call to cause the computing device to switch to the recommended media connection channel with higher quality available, and for pre-call selection the user may expressly select a media connection channel when initiating a call.

If a channel activation request has not been received (NO at 320) the method returns to 320. However, if a channel activation request has been received (YES at 320) the method advances to 322.

At 322, the method includes establishing an audio and/or video connection between the computing device and a recipient computing device over the recommended operational media connection channel. In this way, computing device users can have an audio and/or video conversation. For in-call switching of media connection channels, the establishment of the media connection at 322 may include switching a current media connection channel to the recommended operational media connection channel based on the objective quality scores, the current audio connection channel included in the plurality of media connection channels. This channel switching function may be automatically implemented by the computing device or may be triggered by user input, as discussed above.

Once the audio and/or video connection is established via the operational media connection channel at 322, the method may include monitoring the quality of the operational media connection channel vis a vis the other available media connection channels by conducting comparative testing on each at intervals as described above, and if the quality drops in the operational media connection channel then suggesting a change if a higher quality alternative is available. Thus, at 324 the method includes determining if a test score associated with the operational media connection channel is below a threshold value. It will be appreciated that objective quality scores for the operational connection channel may be dynamically updated by periodically implementing steps 302-314, shown in FIG. 3. If it is determined that the test score associated with the operational media connection channel is not below the threshold value (NO at 324) the method returns to 324. However, if it is determined that the test score associated with the operation media connection channel is below the threshold value (YES at 324), then the method advances to 326. At 326, the method includes selecting a second operational media connection channel from the plurality of media connection channels. In such an example, the second operation media connection channel may have an associated test score greater than the threshold value. In this way, the operational media connection channel can be changed to a channel with a higher quality score when the current connection channel's test score is less than an acceptable value. As a result, call quality is improved, thereby increasing user satisfaction.

Figure 5:
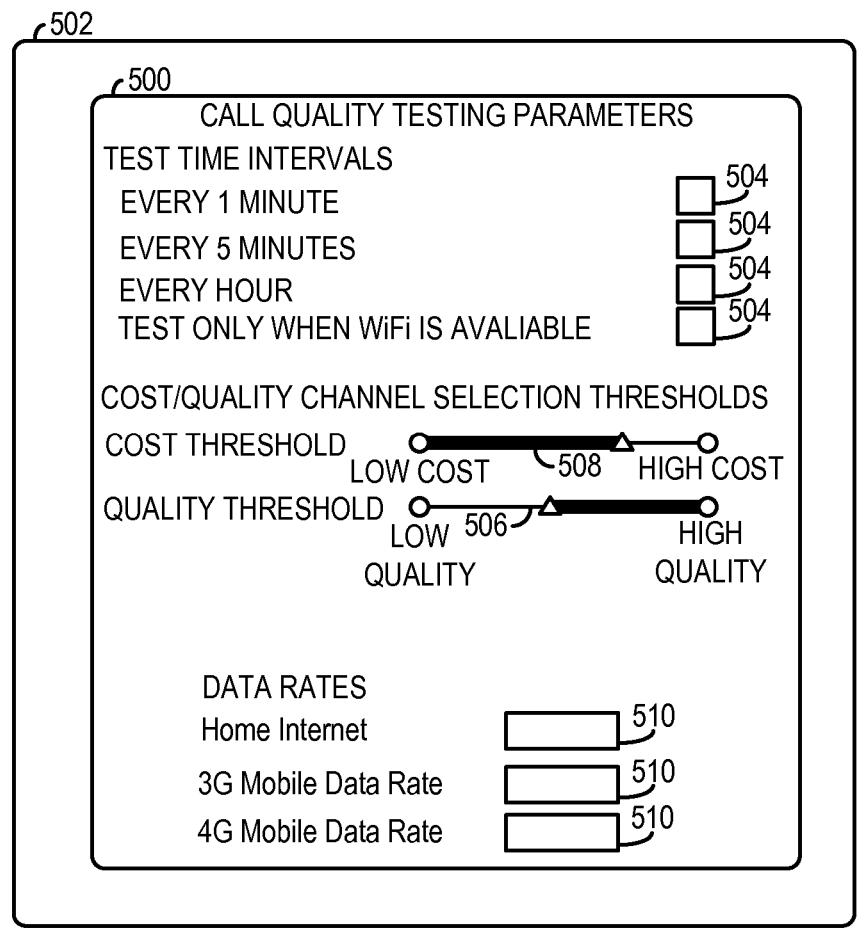
FIG. 5 shows a graphical user interface of the computing system of FIG. 1, for adjusting settings associated with objective scoring tests used by the computing system of FIG. 1.

FIG. 5 shows an exemplary test setting interface 500 presented on a display 502 for modifying various aspects of the comparative testing process. It will be appreciated that the display 502 may be included in the computing device 102, shown in FIG. 1. As illustrated in FIG. 5, a user can select the time interval when the comparative testing is initiated by the computing device via interface controls 504. In this way, the comparative tests can be implemented during desired time intervals. Consequently, the user can customize the testing process according to their desire.

Additionally, a user can select a minimum quality threshold for a media connection channel to be utilized through interface control 506 and a maximum quality threshold through interface control 508. In this way, cost as well as quality thresholds can be set to prevent a user from running up bills above desired levels and to prevent the selection of a channel having a call quality less than an acceptable level. For instance, a user's mobile phone may have very high LTE data costs and therefore a user may prefer not to use an LTE connection even if it may have a higher call quality than other connection channel options. However, numerous interfaces controls have been contemplated that enable users to specify the way in which cost and call quality are taken into account when selecting an operational media connection channel. For instance, the interface may enable a user to select acceptable cost and/or quality ranges. Additionally, a user can input data costs associated with media connection channels into fields 510. However, in other examples the computing device may be configured programmatically determine data costs associated with the media connection channels.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
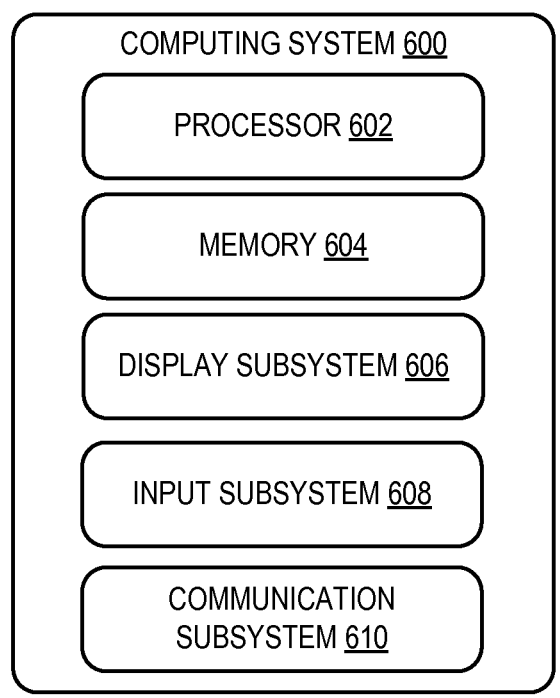
FIG. 6 shows a schematic depiction of example computing hardware that may be used as the computing system of FIG. 1.

FIG. 6 schematically shows a non-limiting embodiment of an example computing system 600 that can enact one or more of the methods and processes described above, and which may be used as the computing device 102, test server 104, or other computing devices of computing system 100 of FIG. 1. Computing system 600 is shown in simplified form. Computing system 600 may take the form of one or more personal computers, server computers, tablet computers, home-entertainment computers, network computing devices, gaming devices, mobile computing devices, mobile communication devices (e.g., smart phone), and/or other computing devices.

Computing system 600 includes a processor 602 and a memory 604. Computing system 600 may optionally include a display subsystem 606, input subsystem 608, communication subsystem 610, and/or other components not shown in FIG. 6.

Processor 602 includes one or more physical devices configured to execute instructions. For example, the processor may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The processor may include one or more processors configured to execute software instructions. Additionally or alternatively, the processor may include one or more hardware or firmware processors configured to execute hardware or firmware instructions. Processors of the processor may be single-core or multi-core, and the instructions executed thereon may be configured for sequential, parallel, and/or distributed processing. Individual components of the processor optionally may be distributed among two or more separate devices, which may be remotely located and/or configured for coordinated processing. Aspects of the processor may be virtualized and executed by remotely accessible, networked computing devices configured in a cloud-computing configuration.

Memory 604 includes one or more physical devices configured to hold instructions executable by the processor to implement the methods and processes described herein. When such methods and processes are implemented, the state of memory 604 may be transformed—e.g., to hold different data.

Memory 604 may include removable and/or built-in devices. Memory 604 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Memory 604 may include volatile, nonvolatile, dynamic, static, read/write, read-only, random-access, sequential-access, location-addressable, file-addressable, and/or content-addressable devices.

It will be appreciated that memory 604 includes one or more physical devices. However, aspects of the instructions described herein alternatively may be propagated by a communication medium (e.g., an electromagnetic signal, an optical signal, etc.) that is not held by a physical device for a finite duration.

Aspects of processor 602 and memory 604 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 600 implemented to perform a particular function. In some cases, a module, program, or engine may be instantiated via processor 602 executing instructions held by memory 604. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 606 may be used to present a visual representation of data held by memory 604. This visual representation may take the form of a graphical user interface (GUI). As the herein described methods and processes change the data held by the memory, and thus transform the state of the memory, the state of display subsystem 606 may likewise be transformed to visually represent changes in the underlying data. Display subsystem 606 may include one or more display devices utilizing virtually any type of technology. Such display devices may be combined with processor 602 and/or memory 604 in a shared enclosure, or such display devices may be peripheral display devices.

When included, input subsystem 608 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 610 may be configured to communicatively couple computing system 600 with one or more other computing devices. Communication subsystem 610 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 600 to send and/or receive messages to and/or from other devices via a network such as the Internet.

The subject matter of the present disclosure is further described in the following paragraphs. According to one aspect, a computing device is provided. The computing device includes communications hardware configured to send and receive communications over a communications network; non-volatile memory storing a test initiation program; a processor configured to execute the test initiation program to: transmit, via the communications hardware, a plurality of comparative testing media streams to a test server, each of the comparative testing media streams sent over one of a plurality of media connection channels; receive, via the communications hardware, a plurality of objective quality scores from the test server, each objective quality score corresponding to one of the plurality of media connection channels and being determined by the test server using an objective scoring test comparing the comparative testing media stream to reference testing data associated with the one of the comparative testing media streams; and select a recommended operational media connection channel from the plurality of media connection channels based on the objective quality scores.

In this aspect, each media connection channel may include a program-and-network pair including a program selected from the group consisting of a cellular telephone program, a VOIP program, and a videoconferencing program, and a network including an access network selected from the group consisting of a cellular carrier network and wireless LAN, and including a backbone network selected from the group consisting of a PSTN and a WAN.

In this aspect, the objective scoring test may be a mean opinion score (MOS) test.

In this aspect, test initiation program may be configured to encode one of the comparative testing media streams prior to transmission to the test server, and the type of encoding of the one of the comparative testing media streams may be selected based on one or more performance parameters of the media connection channel of the plurality of media connection channels which may be associated with the one of the comparative testing media streams.

In this aspect, the plurality of comparative testing media streams may be transmitted to the test server independent of user input.

In this aspect, the test initiation program may be configured to notify a user via a display, speaker, and/or haptic feedback unit of the recommended operational connection channel.

In this aspect, the test initiation program may be configured to establish an audio and/or video connection between the computing device and a recipient computing device over the recommended operational media connection channel in response to receiving a channel activation request for activating the operational media connection channel.

In this aspect, the test initiation program may be configured to switch a current media connection channel to the recommended operational media connection channel based on the objective quality scores, the current media connection channel being included in the plurality of media connection channels.

According to another aspect, a method for operating a computing device is provided. The method includes transmitting a plurality of comparative testing media streams to a test server, each of the comparative testing media streams sent over one of a plurality of media connection channels; receiving a plurality of objective quality scores from the test server, each objective quality score corresponding to one of the plurality of media connection channels and being determined by the test server using an objective scoring test comparing one of the comparative testing media streams to reference testing data associated with the one of the comparative testing media streams; and selecting a recommended operational media connection channel from the plurality of media connection channels based on the objective quality scores.

In this aspect, the method may further include establishing an audio and/or video connection between the computing device and a recipient computing device selected by a user over the operational media connection channel in response to receiving a channel activation request for activating the operational media connection channel.

In this aspect, the comparative testing media streams may be transmitted to the test server prior to establishing the audio and/or video connection between the computing device and the selected recipient computing device.

In this aspect, the method may further include receiving a plurality of third party objective quality scores, each third party quality score determined by the test server based on a third party comparative testing media stream sent from a second computing device to the test server and where the recommended operational media connection channel is selected based on the plurality of third party objective quality scores.

In this aspect, the recommended operational media connection channel may also selected based on data costs corresponding to the plurality of media connection channels.

In this aspect, a time period when one of the comparative testing media streams is sent to the test server may be selected based on one or more performance parameters of the media connection channel associated with the one of the comparative testing media streams.

In this aspect, the method may further include encoding one of the comparative testing media streams prior to transmission to the test server, the type of encoding of the one of the comparative testing media streams being selected based on one or more performance parameters of a media connection channel associated with the one of the comparative testing media streams.

In this aspect, the objective scoring test may be selected from a plurality of objective scoring tests based on one or more parameters of the media connection channel associated with the objective scoring test.

In this aspect, the method may further include selecting a second operation media connection channel from the plurality of media connection channels when the objective quality score of the first operational audio channel is less than a threshold value.

In this aspect, the method may further include, prior to transmitting the plurality of comparative media testing streams, discovering a plurality of network-and-program pairs linked to the plurality of media connection channels, the transmission of the comparative media testing streams being initiated in response to discovering the plurality of network-and-program pairs.

In this aspect, where the plurality of audio connection testing streams may be transmitted to the test server independent of user input.

According to another aspect, a method for operating a test server is provided. The method includes receiving a plurality of comparative testing media streams from a computing device; determining a plurality of objective quality scores associated with each of the comparative testing media streams, each of the plurality of objective quality scores determined using an objective scoring test comparing one of the comparative testing media streams to reference testing data associated with the one of the comparative testing media streams; and sending the plurality of objective quality scores to the computing device.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A computing device, comprising:
communications hardware configured to send and receive communications over a communications network;
non-volatile memory storing a test initiation program;
a processor configured to execute the test initiation program to:
transmit, via the communications hardware, a plurality of comparative testing audio and/or video media streams to a test server, each of the comparative testing audio and/or video media streams sent over one of a plurality of media connection channels;
receive, via the communications hardware, a plurality of objective quality scores from the test server, each objective quality score corresponding to one of the plurality of media connection channels and being determined by the test server using an objective scoring test comparing the comparative testing audio and/or video media stream to reference testing data associated with the one of the comparative testing audio and/or video media streams; and
select a recommended operational media connection channel from the plurality of media connection channels based on the objective quality scores.

2. The computing device of claim 1, where each media connection channel includes a program-and-network pair including a program selected from the group consisting of a cellular telephone program, a VOIP program, and a videoconferencing program, and a network including an access network selected from the group consisting of a cellular carrier network and wireless LAN, and including a backbone network selected from the group consisting of a PSTN and a WAN.

3. The computing device of claim 1, where the objective scoring test is a mean opinion score (MOS) test.

4. The computing device of claim 1, where the test initiation program is configured to encode one of the comparative testing audio and/or video media streams prior to transmission to the test server, and a type of encoding of the one of the comparative testing audio and/or video media streams is selected based on one or more performance parameters of the media connection channel of the plurality of media connection channels which is associated with the one of the comparative testing audio and/or video media streams.

5. The computing device of claim 1, where the plurality of comparative testing audio and/or video media streams are transmitted to the test server independent of user input.

6. The computing device of claim 1, where the test initiation program is configured to notify a user via a display, speaker, and/or haptic feedback unit of the recommended operational media connection channel.

7. The computing device of claim 6, where the test initiation program is configured to establish an audio and/or video connection between the computing device and a recipient computing device over the recommended operational media connection channel in response to receiving a channel activation request for activating the operational media connection channel.

8. The computing device of claim 1, where the test initiation program is configured to switch a current media connection channel to the recommended operational media connection channel based on the objective quality scores, the current media connection channel being included in the plurality of media connection channels.

9. A method for operating a computing device, comprising:
transmitting a plurality of comparative testing audio and/or video media streams to a test server, each of the comparative testing audio and/or video media streams sent over one of a plurality of media connection channels;
receiving a plurality of objective quality scores from the test server, each objective quality score corresponding to one of the plurality of media connection channels and being determined by the test server using an objective scoring test comparing one of the comparative testing audio and/or video media streams to reference testing data associated with the one of the comparative testing audio and/or video media streams; and
selecting a recommended operational media connection channel from the plurality of media connection channels based on the objective quality scores.

10. The method of claim 9, further comprising establishing an audio and/or video connection between the computing device and a recipient computing device selected by a user over the operational media connection channel in response to receiving a channel activation request for activating the operational media connection channel.

11. The method of claim 10, where the comparative testing audio and/or video media streams are transmitted to the test server prior to establishing the audio and/or video connection between the computing device and the selected recipient computing device.

12. The method of claim 9, further comprising receiving a plurality of third party objective quality scores, each third party quality score determined by the test server based on a third party comparative testing audio and/or video media stream sent from a second computing device to the test server and where the recommended operational media connection channel is selected based on the plurality of third party objective quality scores.

13. The method of claim 9, where the recommended operational media connection channel is also selected based on data costs corresponding to the plurality of media connection channels.

14. The method of claim 9, where a time period when one of the comparative testing audio and/or video media streams is sent to the test server is selected based on one or more performance parameters of the media connection channel associated with the one of the comparative testing audio and/or video media streams.

15. The method of claim 9, further comprising encoding one of the comparative testing audio and/or video media streams prior to transmission to the test server, a type of encoding of the one of the comparative testing audio and/or video media streams being selected based on one or more performance parameters of a media connection channel associated with the one of the comparative testing audio and/or video media streams.

16. The method of claim 9, where the objective scoring test is selected from a plurality of objective scoring tests based on one or more parameters of the media connection channel associated with the objective scoring test.

17. The method of claim 9, further comprising selecting another operational media connection channel from the plurality of media connection channels when the objective quality score of the operational media connection channel is less than a threshold value.

18. The method of claim 9, further comprising, prior to transmitting the plurality of comparative testing audio and/or video media streams, discovering a plurality of network-and-program pairs linked to the plurality of media connection channels, the transmission of the comparative testing audio and/or video media streams being initiated in response to discovering the plurality of network-and-program pairs.

19. The method of claim 9, where the plurality of comparative testing audio and/or video media streams are transmitted to the test server independent of user input.

20. A method for operating a test server comprising:
receiving a plurality of comparative testing audio and/or video media streams from a computing device;
determining a plurality of objective quality scores associated with each of the comparative testing audio and/or video media streams, each of the plurality of objective quality scores determined using an objective scoring test comparing one of the comparative testing audio and/or video media streams to reference testing data associated with the one of the comparative testing audio and/or video media streams; and
sending the plurality of objective quality scores to the computing device, in order to cause the computing device to select a recommended operational media channel connection based on the objective quality scores.

* * * * *